(12) United States Patent
Brothers et al.

(10) Patent No.: US 8,817,029 B2
(45) Date of Patent: Aug. 26, 2014

(54) GPU PIPELINE SYNCHRONIZATION AND CONTROL SYSTEM AND METHOD

(75) Inventors: John Brothers, Calistoga, CA (US); Timour Paltashev, Fremont, CA (US); Hsilin Huang, Milpitas, CA (US); Qunfeng Liao, San Jose, CA (US)

(73) Assignee: Via Technologies, Inc., Taipei (TW)

( * ) Notice: Subject to any disclaimer, the term of this patent is extended or adjusted under 35 U.S.C. 154(b) by 828 days.

(21) Appl. No.: 11/468,435

(22) Filed: Aug. 30, 2006

(65) Prior Publication Data

US 2007/0091100 A1      Apr. 26, 2007

Related U.S. Application Data

(60) Provisional application No. 60/730,444, filed on Oct. 26, 2005.

(51) Int. Cl.
| | |
|---|---|
| *G06T 1/00* | (2006.01) |
| *G06F 15/00* | (2006.01) |
| *G06T 1/20* | (2006.01) |
| *G06F 15/16* | (2006.01) |
| *G06F 9/54* | (2006.01) |
| *G06F 9/38* | (2006.01) |
| *G06F 9/48* | (2006.01) |
| *G06F 9/52* | (2006.01) |

(52) U.S. Cl.
CPC . *G06F 9/542* (2013.01); *G06T 1/20* (2013.01); *G06F 9/3879* (2013.01); *G06F 9/485* (2013.01); *G06F 9/526* (2013.01)
USPC ........... 345/501; 345/502; 345/506; 345/522; 712/40; 712/219

(58) Field of Classification Search
USPC ............ 345/501–506, 522, 556, 422; 712/40, 712/219
See application file for complete search history.

(56) References Cited

U.S. PATENT DOCUMENTS

| | | |
|---|---|---|
| 4,855,936 A | 8/1989 | Casey et al. |
| 4,862,155 A | 8/1989 | Dalrymple et al. |
| 4,916,301 A | 4/1990 | Mansfield et al. |
| 5,097,411 A | 3/1992 | Doyle et al. |
| 5,230,039 A | 7/1993 | Grossman et al. |

(Continued)

OTHER PUBLICATIONS

Brothers, et al., Non-Final Office Action, mailed Jun. 8, 2009, filing date Oct. 25, 2006, U.S. Appl. No. 11/552,649.

*Primary Examiner* — Tize Ma
(74) *Attorney, Agent, or Firm* — McClure, Qualey & Rodack, LLP

(57) ABSTRACT

A graphics pipeline configured to synchronize data processing according to signals and tokens has at least four components. The first component has one input and one output and communicates output tokens or wire signals after receiving tokens on the input, an internal event occurrence, or receipt of a signal on an input path. The second component has one input and a plurality of outputs and communicates tokens or wire signals on one of the outputs after receiving tokens on the input, an internal event occurrence, or receipt of a signal on an input path. The third component has a plurality of inputs and one output and communicates tokens or wire signals on the output after receiving tokens on one of the inputs, an internal event occurrence, or receipt of a signal on an input path. The fourth component has a plurality of inputs and a plurality of outputs and has the capabilities of both the third and forth components.

14 Claims, 12 Drawing Sheets

(56) References Cited

U.S. PATENT DOCUMENTS

| | | |
|---|---|---|
| 5,293,587 A | 3/1994 | Deb et al. |
| 5,299,309 A | 3/1994 | Kuo et al. |
| 5,315,696 A | 5/1994 | Case et al. |
| 5,706,478 A | 1/1998 | Dye |
| 6,208,361 B1 | 3/2001 | Gossett |
| 6,252,610 B1 | 6/2001 | Hussain |
| 6,329,996 B1 | 12/2001 | Bouen et al. |
| 6,476,808 B1 | 11/2002 | Kuo et al. |
| 6,483,505 B1 | 11/2002 | Morein et al. |
| 6,708,269 B1 | 3/2004 | Tiruvallur et al. |
| 6,782,432 B1 | 8/2004 | Nelson et al. |
| 6,806,880 B1 | 10/2004 | Mukherjee et al. |
| 6,833,831 B2 | 12/2004 | Emberling et al. |
| 6,867,781 B1 | 3/2005 | Van Hook et al. |
| 6,954,204 B2 | 10/2005 | Zatz et al. |
| 7,353,369 B1 * | 4/2008 | Coon et al. ............ 712/234 |
| 2003/0001840 A1 | 1/2003 | Spitzer et al. |
| 2003/0023971 A1 | 1/2003 | Martinolich et al. |
| 2003/0169259 A1 * | 9/2003 | Lavelle et al. ............ 345/501 |
| 2004/0008200 A1 | 1/2004 | Naegle et al. |
| 2004/0135787 A1 | 7/2004 | Parikh et al. |
| 2004/0189650 A1 | 9/2004 | Deering |
| 2005/0030311 A1 | 2/2005 | Hara et al. |
| 2005/0046633 A1 | 3/2005 | Aleksic et al. |

\* cited by examiner

GPU PIPELINE SYNCHRONIZATION AND CONTROL SYSTEM AND METHOD

CROSS REFERENCE TO RELATED APPLICATION

This application claims priority to U.S. Provisional Application entitled "GPU Synchronization and Scheduling System, Method, and Apparatus," having Ser. No. 60/730,444, as filed on Oct. 26, 2005, which is entirely incorporated herein by reference. This application is also related to copending U.S. patent application Ser. Nos. 11/552,649 and 11/552,693, both filed Oct. 25, 2006.

TECHNICAL FIELD

The present disclosure relates to graphics processing, and more particularly, to a method and apparatus for synchronizing and controlling a graphics pipeline.

BACKGROUND

Current computer applications are generally more graphically intense and involve a higher degree of graphics processing power than predecessors. Applications, such as games, typically involve complex and highly detailed graphics renderings that involve a substantial amount of ongoing computations. To match the demands made by consumers for increased graphics capabilities in computing applications, like games, computer configurations have also changed.

As computers, particularly personal computers, have been programmed to handle programmers' ever increasingly demanding entertainment and multimedia applications, such as high definition video and the latest 3D games, higher demands have likewise been placed on system bandwidth. Thus, methods have arisen to deliver the bandwidth for such bandwidth hungry applications, as well as providing additional bandwidth headroom for future generations of applications.

For these reasons, current computer systems oftentimes include multiple processors. For example, a graphics processing unit (GPU) is an example of a coprocessor in addition to a primary processor, such as a central processing unit (CPU), that performs specialized processing tasks for which it is designed. In performing these tasks, the GPU may free the CPU to perform other tasks. In some cases, coprocessors, such as a GPU, may actually reside on the computer system's motherboard along with the CPU, which may be a microprocessor. However, in other applications, as one of ordinary skill in the art would know, a GPU and/or other coprocessing devices may reside on a separate but electrically coupled card, such as a graphics card in the case of the GPU.

A coprocessor such as a GPU may often access supplemental memory, such as video memory, for performing its processing tasks. Coprocessors may be generally configured and optimized for performing specialized tasks. In the case of the GPU, such devices may be optimized for execution of three dimensional graphics calculations to support applications with intensive graphics. While conventional computer systems and coprocessors may adequately perform when running a single graphically intensive application, such computer systems and coprocessors may nevertheless encounter problems when attempting to execute multiple graphically intensive applications at once.

It is not uncommon for a typical coprocessor to schedule its processing workload in an inefficient manner. In some operating systems, a GPU may be multitasked using an approach that submits operations to the GPU in a serialized form such that the GPU executes the operations in the order in which they were received.

One problem with this approach is that it does not scale well when many applications with differing priorities access the same resources. In this nonlimiting example, a first application that may be currently controlling the resources of a GPU coprocessor needs to relinquish control to other applications for the other applications to accomplish their coprocessing objectives. If the first application does not relinquish control to the other waiting application, the GPU may be effectively tied up such that the waiting application is bottlenecked while the GPU finishes processing the calculations related to the first application. As indicated above, this may not be a significant bottleneck in instances where a single graphically intensive application is active; however, the problem of tying up a GPU or other coprocessor's resources may become more accentuated when multiple applications attempt to use the GPU or coprocessor at the same time.

The concept of apportioning processing between operations has been addressed with the concept of interruptible CPUs that context switch from one task to another. More specifically, the concept of context save/restore has been utilized by modern CPUs that operate to save the content of relevant registers and program counter data to be able to resume an interrupted processing task. While the problem of apportioning processing between the operations has been addressed in CPUs, where the sophisticated scheduling of multiple operations is utilized, scheduling for coprocessors has not been sufficiently addressed.

At least one reason for this failure is related to the fact that coprocessors, such as GPUs, are generally viewed as a resource to divert calculation-heavy and time consuming operations away from the CPU so that the CPU may be able to process other functions. It is well known that graphics operations can include calculation-heavy operations and therefore utilize significant processing power. As the sophistication of graphics applications has increased, GPUs have become more sophisticated to handle the robust calculation and rendering activities.

Yet, the complex architecture of superscalar and EPIC-type CPUs with parallel functional units and out-of-order execution has created problems for precise interruption in CPUs where architecture registers are to be renamed, and where several dozens of instructions are executed simultaneously in different stages of a processing pipeline. To provide for the possibility of precise interrupts, superscalar CPUs have been equipped with a reorder buffer and an extra stage of "instruction commit (retirement)" in the processing pipeline.

Current GPU are becoming more and more complex by including programmable and fixed function units connected by multiple FIFO-type buffers. Execution of each GPU command may take from hundreds to several thousand cycles. GPU pipelines used in today's graphics processing applications have become extremely deep in comparison to CPUs. Accordingly, most GPUs are configured to handle a large amount of data at any given instance, which complicates the task of attempting to apportion the processing of a GPU, as the GPU does not have a sufficient mechanism for handling this large amount of data in a save or restore operation.

Modern GPU configurations that have evolved so as to handle large amounts of data have taken upon complex shapes that involve new mechanisms for synchronization for the pipeline units in data stream processing. Using programmable parallel processing units in addition to main fixed function graphics pipeline units involves maintaining the order of graphics primitive data that may be received and updated in the different stages of the GPU pipeline. Plus, maintaining multiple contexts simultaneously with interruptability in the graphics pipeline of the GPU involves the resynchronization of such interrupted context with minimal performance loss and smooth switching between an interrupted and resumed graphics context. Current GPU configurations, however, do not handle synchronization of contexts well, instead resulting in a complete flush of the pipeline, thereby resulting in less efficient operation and reduced graphics capabilities.

Further, multi pass rendering when a GPU renders a surface that becomes a source surface for a next pass also involves synchronization to avoid RAW (read after write) data hazards when a second pass starts to access the shared surface. Plus, synchronization with CPU task execution when a GPU is supposed to start and/or resume a certain context execution depending upon events in CPU threads and current GPU context is also an issue in current GPU processing implementations. Yet, current CPUs are simply unable to communicate and respond to such changes in a timely manner so as to maintain pace with the increasing demands of graphics applications.

Thus, there is a heretofore-unaddressed need to overcome these deficiencies and shortcomings described above.

SUMMARY

A graphics pipeline may be configured to synchronize processing of data according to wire signals and event tokens. Wire signals may reach designated pipeline components asynchronously with delay of electric circuits. Event tokens may reach designated pipeline components with variable delay related to intermediate data buffering in FIFOs but are synchronized with other data moving on the same path data entries. Such a graphics pipeline may include a first component having one input and one output. The first component may be configured to output tokens or wire signals resulting from receiving tokens on the one input, a predetermined event internal to the first component, or from receiving a predetermined signal on an input path of the first component.

A second component of the graphics pipeline may have one input but a plurality of outputs. This second component may be configured to output tokens or wire signals on at least one of the plurality of outputs or even the same token on all of the plurality of outputs. The output of a token or wire signal by the second component may result from the second component receiving certain tokens on its one input, a predetermined event internal to the second component, or from receiving a predetermined signal on an input path of the second component.

The graphics pipeline may also include a third component that has a plurality of inputs but one output. The third component may be configured to output tokens or wire signals on its one output, which may result from the third component having received select tokens on one of the plurality of inputs, a predetermined event internal to the third block, or from receiving a predetermined signal on an input path to the third component. Also, the third component may be configured to switch between its plurality of inputs upon receipt of a designated token that may signify corresponding data to be processed on one of the other inputs, thereby maintaining synchronization in the pipeline.

A fourth type of component of the graphics pipeline may have a plurality of inputs and a plurality of outputs. This fourth type of component may be configured with the functionality of each of the three previously described components. Thus, the fourth component may be configured to output tokens or wire signals on at least one of the plurality of outputs after receiving particular tokens on one of the plurality of inputs of the fourth component, a predetermined event internal to the fourth component, or from receiving a predetermined signal on an input path of the fourth component.

The tokens or wire signals received and output by each of the four previously describe components may comprise event start tokens/signals, event end tokens/signals, and data-related tokens/signals. Thus, the four components may take certain actions upon receipt of these tokens or signals on the respective input paths and/or may also generate individual or duplicative tokens for the outputs of the components or signals for output signal paths of the four components for maintaining synchronization with other components in the graphics pipeline.

DETAILED DESCRIPTION OF DRAWINGS

DETAILED DESCRIPTION

Figure 1:
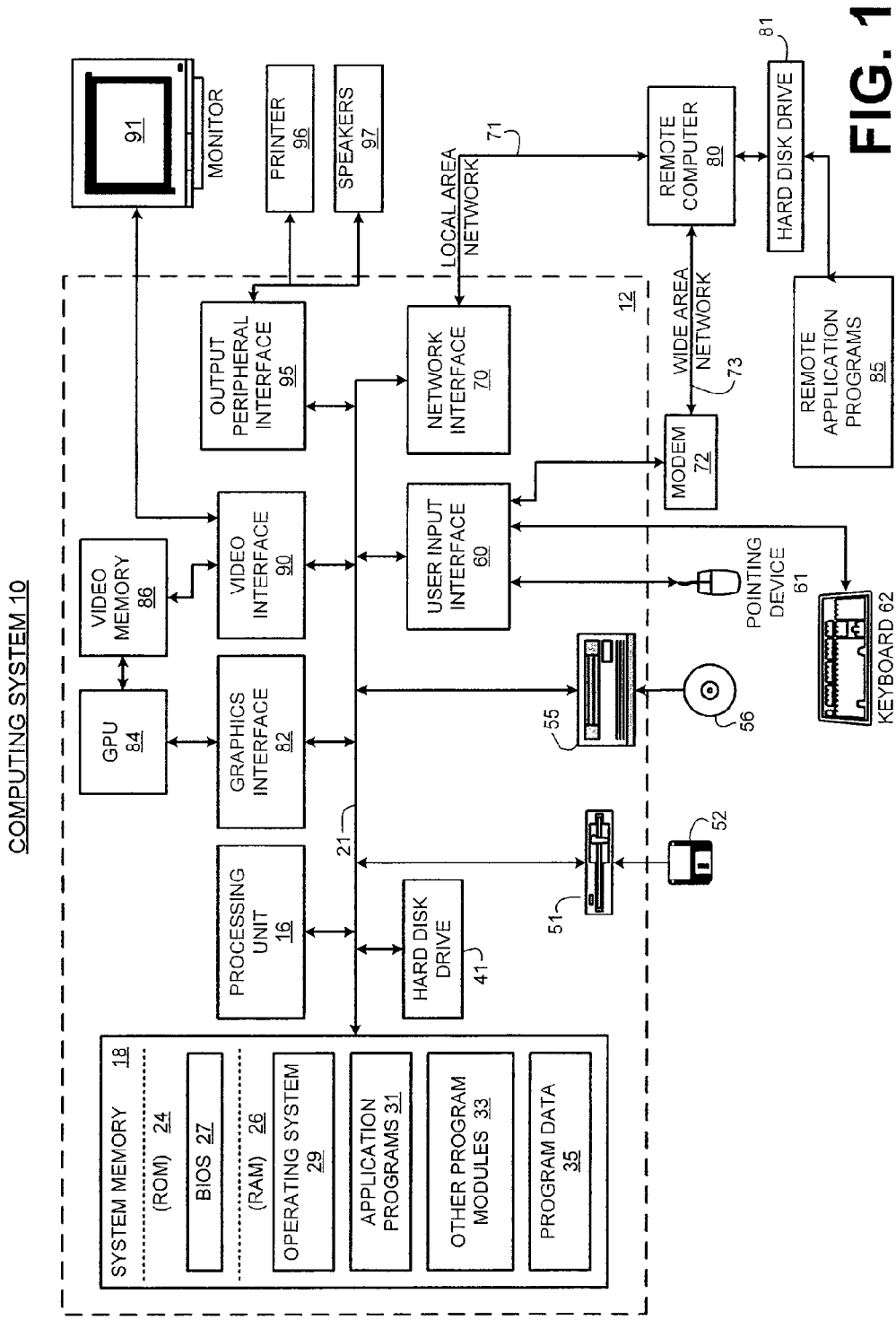
FIG. 1 is a diagram illustrating an exemplary nonlimiting computing system that includes a computer.

FIG. 1 is a diagram illustrating an exemplary nonlimiting computing system 10 that includes a computer 12. The components of the computer 12 may include, as nonlimiting examples, a processing unit 16, a system memory 18, and a system bus 21 that couples various system components, including the system memory 18, to the processing unit 16. The system bus 21 may be any of several types of bus structures, as one of ordinary skill in the art would know, including a memory bus or memory controller, a peripheral bus, and a local bus using any of a variety of bus architectures. As a nonlimiting example, such architectures may include a peripheral component interconnect (PCI) bus, accelerated graphics port (AGP), and/or PCI Express bus.

Computer 12 may include a variety of computer readable media. Computer readable media can be any available media that can be accessed by computer 12 and includes both volatile and nonvolatile memory, which may be removable, or nonremovable memory.

The system memory 18 may include computer storage media in the form of volatile and/or nonvolatile memory, such as read only memory (ROM) 24 and random access memory (RAM) 26. A basic input/output system 27 (BIOS) may be stored in ROM 24. As a nonlimiting example, operating system 29, application programs 31, other program modules 33, and program data 35 may be contained in RAM 26.

Computer 12 may also include other removable/nonremovable volatile/nonvolatile computer storage media. As a nonlimiting example, a hard drive 41 may read from or write to nonremovable, nonvolatile magnetic media. A magnetic disk drive 51 may read from or write to a removable, nonvolatile magnetic disk 52. An optical disk drive 55 may read from or write to optical disk 56.

A user may enter commands and information into computer 12 through input devices such as keyboard 62 and pointing device 61, which may be coupled to processing unit 16 through a user input interface 60 that is coupled to system bus 21. However, one of ordinary skill in the art would know that other interface and bus structures such as a parallel poll, game port, or a universal serial bus (USB) may also be utilized for coupling these devices to the computer 12.

One or more graphics processing units (GPUs) 84 may communicate with the graphics interface 82 that is coupled to system bus 21. As a nonlimiting example, GPU 84 may include on-chip memory storage, such as register storage and cache memory. GPU 84 may also communicate with a video memory 86, as desired.

A monitor 91 or other type of display device may be also coupled to system bus 21 via a video interface 90, which may also communicate with video memory 86. In addition to monitor 91, computer system 10 may also include other peripheral output devices, such as printer 96 and speakers 97, which may be coupled via output peripheral interface 95.

Computer 12 may operate in networked or distributed environments using logical connections to one or more remote computers, such as remote computer 80. Remote computer 80 may be a personal computer, a server, a router, a network PC, a pier device, or other common network node. Remote computer 80 may also include many or all of the elements described above in regard to computer 12, even though only memory storage device 81 and remote application programs 85 are depicted in FIG. 1. The logical connections depicted in FIG. 1 include a local area network (LAN) 71 and a wide area network (WAN) 73, but may include other network/buses, as one of ordinary skill in the art would know.

In this nonlimiting example of FIG. 1, remote computer 80 may be coupled to computer 12 via LAN connection 71 and network interface 70. Likewise, a modem 72 may be used to couple computer 12 (via user input interface 60) to remote computer 80 across WAN connection 73.

As stated above, the GPU 84 may be configured to switch processes, or contexts, during the processing of another context, or operation. In this instance, the GPU 84 is configured to save an interrupted context and to initiate processing of another context, which itself may have been previously interrupted and saved.

GPU 84 may be configured to support sequential execution of multiple GPU programs (commands) belonging to the same context. Yet, as stated above, in order to synchronize execution of the GPU 84 in tandem with processing unit 16, multiple levels or synchronization may be utilized.

A global level memory data access system synchronization may be a first high level method of synchronizing the processing unit 16 application or driver and a GPU context being implemented by GPU 84. As a second level or an intermediary level of synchronization, memory data access synchronization may occur between two GPU contexts that are being implemented with GPU 84. Thus, as described above, synchronization between two contexts may occur in the instance where one context in interrupted so that a second context may resume or initiate from prior execution. As a third level of synchronization, the pipeline in GPU 84 itself may be configured such that the individual unit or components of the pipeline may be synchronized, which may constitute a lower internal level of synchronization. Thus, three levels of synchronization may be utilized so that the processing unit 16 may be synchronized in tandem with GPU 84 to handle complex and convoluted processing operations.

Figure 2:
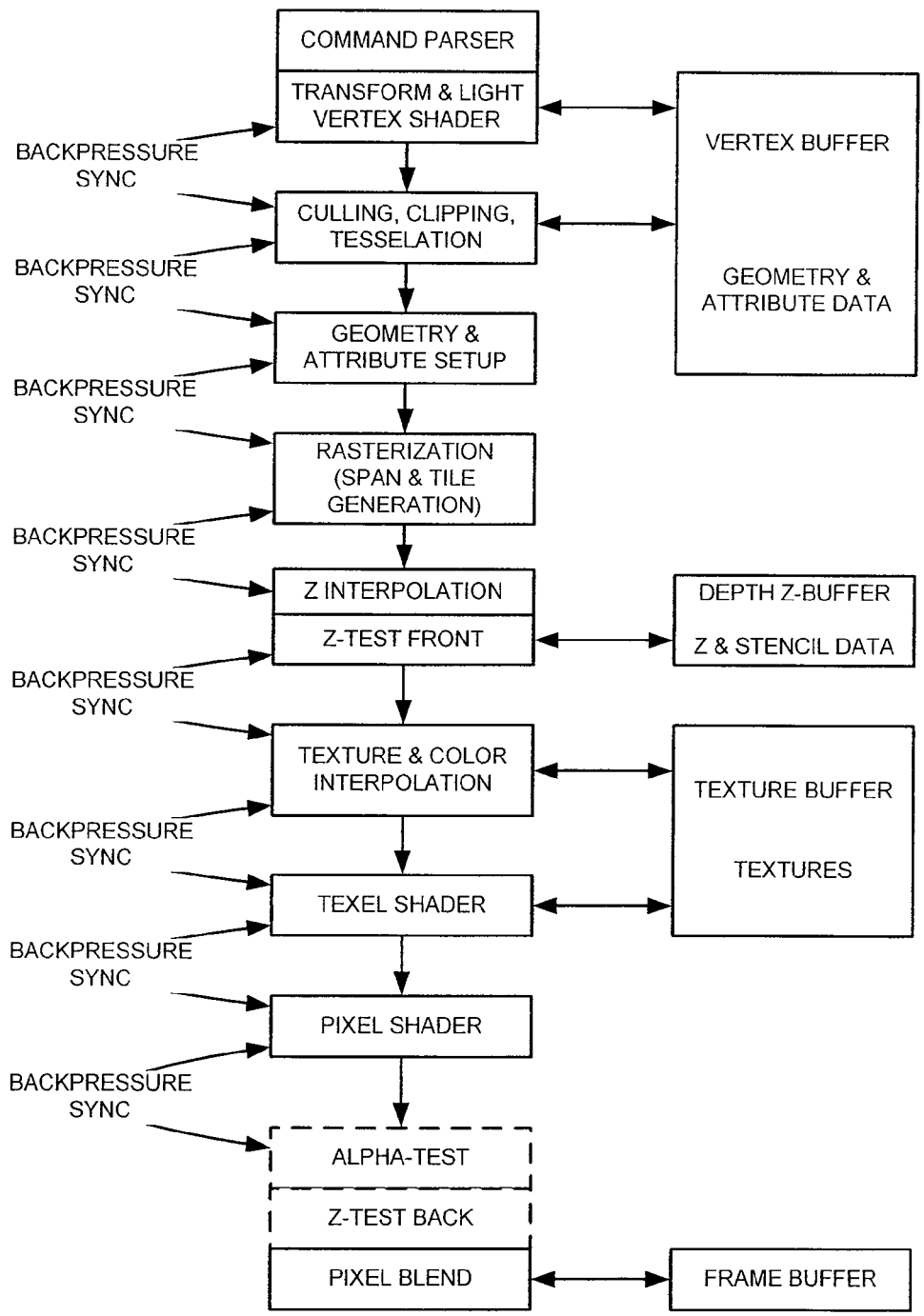
FIG. 2 is a diagram of typical graphics pipeline that may be found in the GPU of FIG. 1.

FIG. 2 is a diagram of a typical graphics pipeline 100 that may be found in a GPU 84 that one of ordinary skill in the art would know. Although the individual components that comprise the graphics pipeline 100 are not separately described herein, one of ordinary skill in the art would understand their operation and interaction so as to process graphical information.

Yet, older synchronization mechanisms may not operate as fast with newer multi-thread CPU supporting simultaneous execution of multiple graphics tasks. Stated another way, graphics pipeline 100 of FIG. 1 may not be able to maintain pace with a multithread CPU that may attempt to process multiple graphics tasks or context essentially simultaneously, thereby resulting in significant performance degradation.

At least one reason for this situation may reside in the fact that the graphics pipeline 100 may be configured so that the various components of the pipeline 100 may synchronize with a next neighbor. This concept is shown by the back pressure synchronization, which stalls the pipeline between each corresponding component. This method of synchronization may support execution of multiple context, but involves complete pipeline flush, which takes significant time. Implementing a context switch in such pipeline occurs more slowly than may be desired, which may largely be accountable for performance degradation of the graphics pipeline 100.

Figure 3:
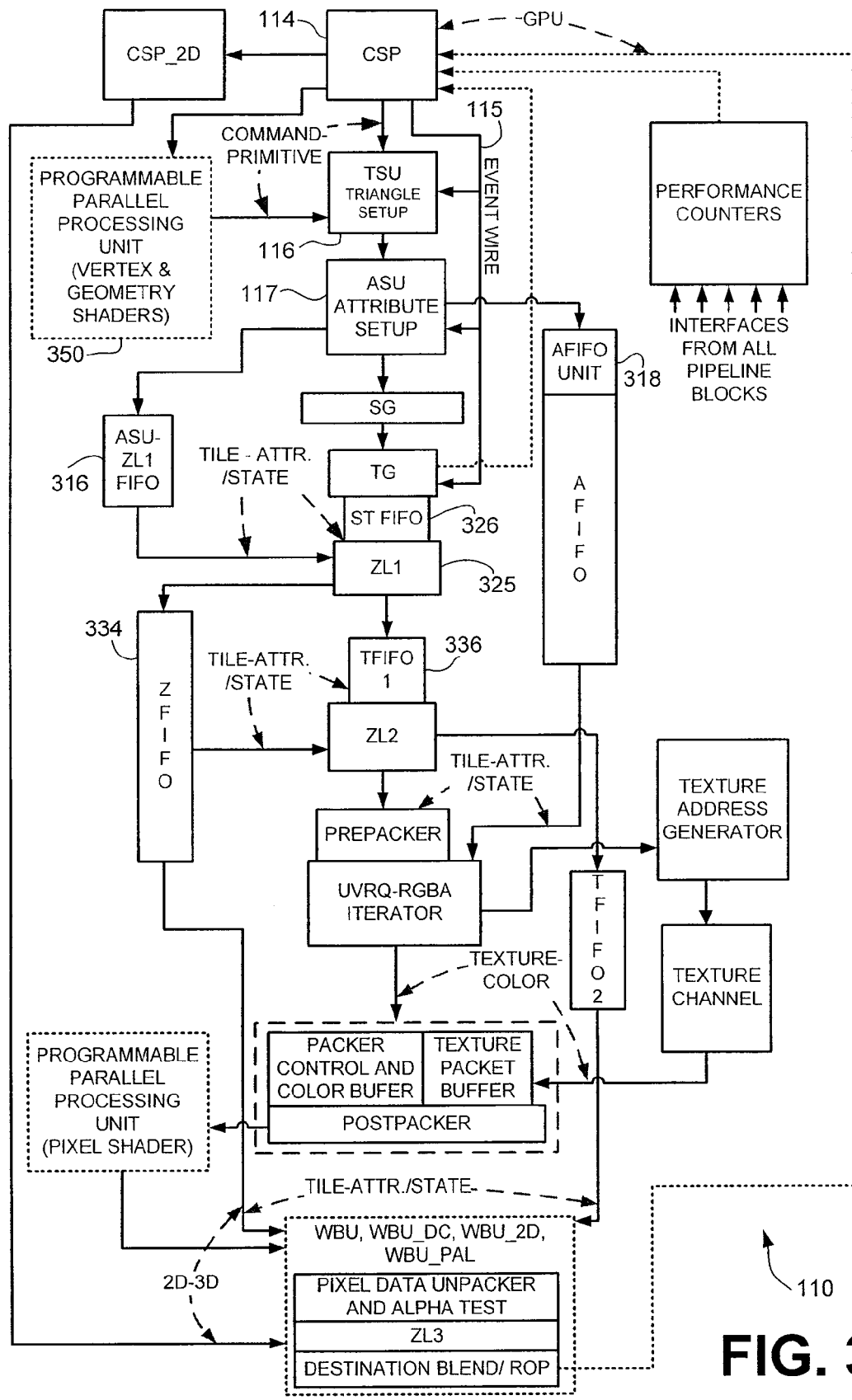
FIG. 3 is a diagram of a GPU graphics pipeline that may exist in the GPU of FIG. 1 and may comprise a mix of fixed function and programmable units coupled to each other via multiple FIFOs that communicate different data structures.

FIG. 3 is a diagram 110 of GPU graphics pipeline that may exist in the GPU of FIG. 1 and may comprise a mix of fixed function and programmable units coupled to each other via multiple FIFOs that communicate different data structures. Synchronization of the GPU graphics pipeline 110 may therefore constitute a nontrivial task due to the multiple type blocks that do not have merely one input or one output, as opposed to the components of the GPU graphics pipeline 100 of FIG. 2. Thus, in attempting to synchronize a GPU graphics pipeline 110 of FIG. 3, the different types of data flows should be acknowledged so as to maintain sequential order of graphics primitive rendering as well as timing synchronization among 2D, 3D, video, and other channels of a modern GPU.

Unified programmable parallel processing units may be used in several stages of the GPU graphics pipeline 110 and may generate out of order results that should be reordered and synchronized with other data flows for further graphics related processing. Synchronization of command/state and data processing in the GPU graphics pipeline 110 may involve insertion of special markup tokens that may be recognized by the individual units in the GPU graphics pipeline 110 and may also be used for data/command flow in the low level synchronization methodology described above.

In at least one nonlimiting example, the GPU graphics pipeline 110 of FIG. 3 may employ at least two types of markup tokens that may be inserted by the various processing components of the GPU graphics pipeline 110 in the data/command flow. A first such mark up token may be a data-based token, which may be configured to signify an end of data entity of any type. As a nonlimiting example, a data-based token may include an "end of state block," an "End of primitive block," "End of 3D command block," and "End of 2D command block," etc. These nonlimiting exemplary tokens may be useful when there is an uncertain amount of data in entities traveling through the GPU graphics pipeline 110 of FIG. 3.

A second type of markup token may be an event-based token, which may be configured to signal information regarding a particular event that may have happened in one of the processing components of the GPU graphics pipeline 110. Event-based tokens may be understood to include both an event start token and an event end token. As a nonlimiting example, a token such as "Context_end" and "DMA_end." Likewise, "interrupt end" may be a nonlimiting exemplary event end token.

In at least one embodiment, the processing blocks in GPU graphics pipeline 110 may be configured so as to be able to insert both data-based tokens and event-based tokens so as to provide synchronization of data, command, and state processing flows. By inserting these tokens throughout GPU graphics pipeline 110, the various processing components therein may provide the desired low level synchronization mechanism.

Another synchronization tool that may be used may include an event signal, which may be communicated on event wire 115 in FIG. 3 as one nonlimiting example, be generated in any pipeline processing block in GPU graphics pipeline 110 in response to any condition or hard wire or event. This signal may be wired to one or more other processing blocks in GPU graphics pipeline 110. By coupling the event wire signal 115 to one or more other blocks, the communication of an event wire signal on the event wire line 115 may operate to change the processing sequence, as one nonlimiting example, or may result in the discarding of certain data and commands in particular components in the GPU graphics pipeline that receive the event wire signal.

In much the same way as described regarding event-based tokens, event signals communicated on the event wire 115 may be configured in pairs of such signals, such as an event start and an event end signal. Plus, event signals may be paired with event-based tokens for synchronization control in at least the following combinations:
1. Event start signal/Event end token
2. Event start token/Event end signal
3. Event start signal/Event end signal
4. Event start token/Event end token Combinations of event signals and event tokens may be different depending upon the configuration of pipeline synchronization. Input event tokens and signals functionality for various blocks and graphics pipeline 110 may be utilized to accomplish a desired result in a given instance. Thus, to initiate an event, a token may be received by a block that may be sourced from a previous block in the graphics pipeline 110, such as from a FIFO buffer that may be configured between a pair of blocks. Upon receipt of the token, a feedback loop may be initiated so as to empty a FIFO buffer, as a nonlimiting example. Another start of event situation may include an event signal, such as event wire 115 of FIG. 3. The event signal that may be communicated by event wire 115 may be external from any particular processing component of graphics pipeline 110 and may be related to a local component event.

To end an event, an input token may be received from a previous block and may signify the end of a certain activity, such as the emptying of a FIFO buffer for the recipient block. A signal wire may also be used as an end of event identifies so as to bring a certain operation to an end. More specifically, event wire 115 may be utilized so as to communicate a signal from one block, such as the CSP 114 in graphics pipeline 110, into one of the processing blocks so as to communicate the end of a designated activity or local block event.

Event tokens and event signals may also be used for output operations within the blocks of graphics pipeline 110. To initiate an event, a token may be output from a first block and may be communicated to other blocks in the graphics pipeline for operations, such as the aforementioned feedback loop. Similarly, one block may send an event signal to any other block in the graphics pipeline 110 (FIG. 3) to bring about a predetermined result.

To end an event, an output token may also be communicated from any component in the graphics pipeline 110 to a designation component, such as the following component in the graphics pipeline 110. As a nonlimiting example, the output token may cause the recipient component to switch contexts by the purging of data related to a context being stopped. Thus, a token may be output from one component in the graphics pipeline 110 to another component so as to cause data in the memory of another component to be discarded so as to cause data in the memory of another component to be discarded for preparation of processing of a new context. Plus, any component could be configured to use an event signal for communication with any other component, as configured and shown in FIG. 3, so as to bring an event to its end.

It should be noted that within the graphics pipeline 110 of FIG. 3, in order to accomplish the synchronization via tokens, event signals, and backpressure synchronization signals (as similarly shown in FIG. 2) components of the pipeline may be configured to handle these types of communications. Thus, the graphics pipeline 110 may include a corresponding number of types of components that are configured for receiving event tokens, event signals, backpressure wire synchronization signals, as well as output the same to other components.

Figure 4:
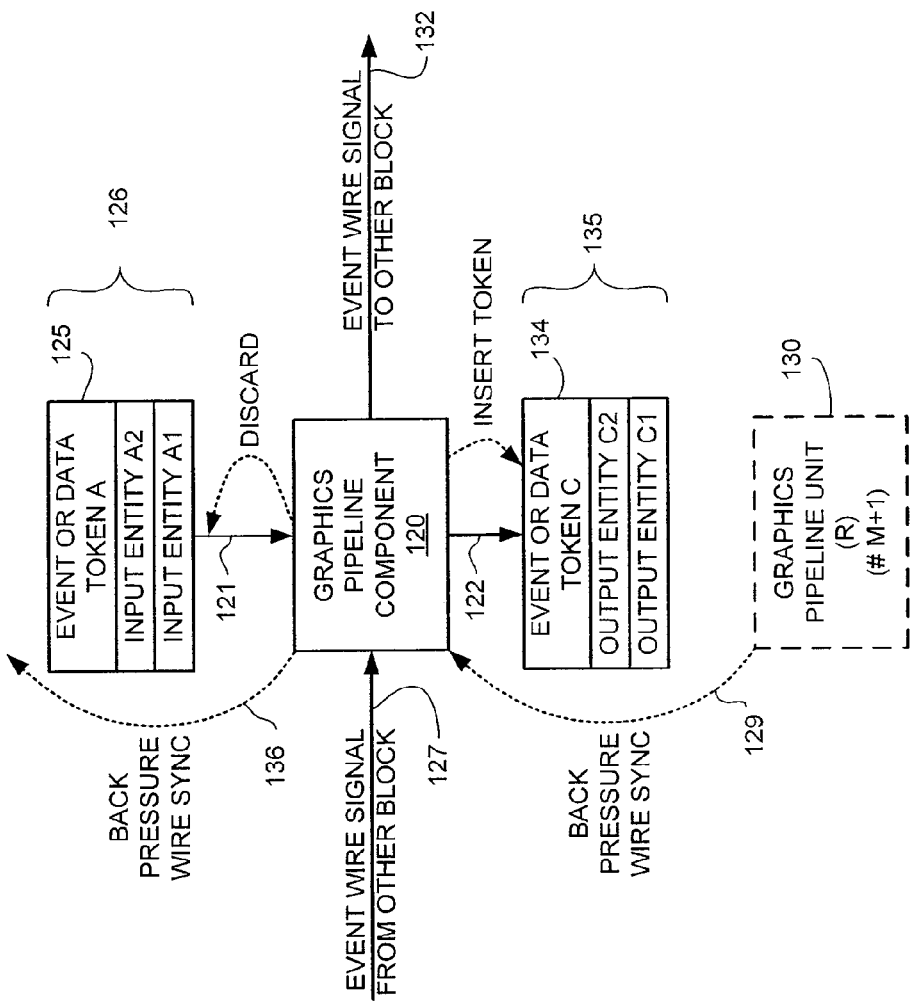
FIG. 4 is a diagram of a regular type of component that may be included in the graphics pipeline of FIG. 3.

FIG. 4 is a diagram of a regular type of graphics pipeline unit (or block) 120 that may be included in the graphics pipeline 110 of FIG. 3. The regular type graphics pipeline component 120 has one data input 121 and one data output 122 and may also be configured for backpressure synchronization or stall signals via paths 129 and 136, as one of ordinary skill in the art would know.

The graphics pipeline component 120 of FIG. 4 may be configured to receive tokens or event signals (or another predetermined event) from one of three sources. As a nonlimiting example of a first source, a token 125, which may be an event or a data token, as described above, may be placed by another graphics pipeline component (not shown) in the processing FIFO 126 for execution by the graphics pipeline 120. Thus as the graphics pipeline component 120 processes the contents of FIFO 126, the event or data token 125 will ultimately be reached, therefore signifying the initiation or commencement of a corresponding event. As a nonlimiting example and as stated above, the event or data token 125 may be configured such that the graphics pipeline component 120 thereafter initiates a discard sequence to empty the contents of FIFO 126 for preparation of a new context to be subsequently executed, which is one manner in which the components of graphics pipeline 110 may be synchronized.

As a second form of input, which is another nonlimiting example, graphics pipeline 120 may be configured to receive an event signal from another component along path 127, as shown in FIG. 4. As discussed above, the event signal received on path 127 may cause the initiation or the completion of a certain predetermined series of operations.

Thirdly, graphics pipeline component 120 may receive a backpressure synchronization signal on path 129 (which may also be recognized as a backpressure wire synchronization) from graphics pipeline unit 130, which may be a unit subsequent in the graphics pipeline 110 of FIG. 3. Receipt of this signal on path 129 may lead to the synchronization of the two components in correspondence with a particular event.

The graphics pipeline component 120 of FIG. 4 may also be configured to output event or data tokens like the ones that may be received for causing certain events to transpire within the graphics pipeline 110 of FIG. 3. As discussed above, a component, such as graphics pipeline component 120, may be configured to place an event or data token in FIFO 135 of a subsequent component in the graphics pipeline 110 of FIG. 3. Thus, as similarly described above, with FIFO 126, the event or data token 134, as placed by graphics pipeline component 120 within FIFO 135, may cause the subsequent graphics processing component, such as graphics processing component 130 (or graphics pipeline unit) to follow a corresponding set of actions with the event or data token 134 is received.

Graphics pipeline component 120 may also be configured to output an event signal (or an event wire signal), as discussed above, to any other block within the graphics pipeline 110 of FIG. 3 along path 132 (which may be a wire), in similar fashion as described above, that is coupled to path 132. Thus, graphics pipeline component 120 may initiate or cease processing within another component according to an event signal sent upon path 132.

Thus, as described above, this regular-type graphics processing component 120 may be but of one type processing type within the graphics pipeline 110 of FIG. 3. As also discussed above, this regular-type unit 120 may be configured to receive event tokens and/or signals, as well as output same, so as to provide synchronization of at least this type of unit within the graphics pipeline 110.

While the regular-type graphics processing component 120 of FIG. 4 contains hut one output, some processing blocks within graphics pipeline 110 may contain two or more outputs. Thus, a fork-type block is instituted wherein data, commands and states may take one of multiple output paths.

Figure 5:
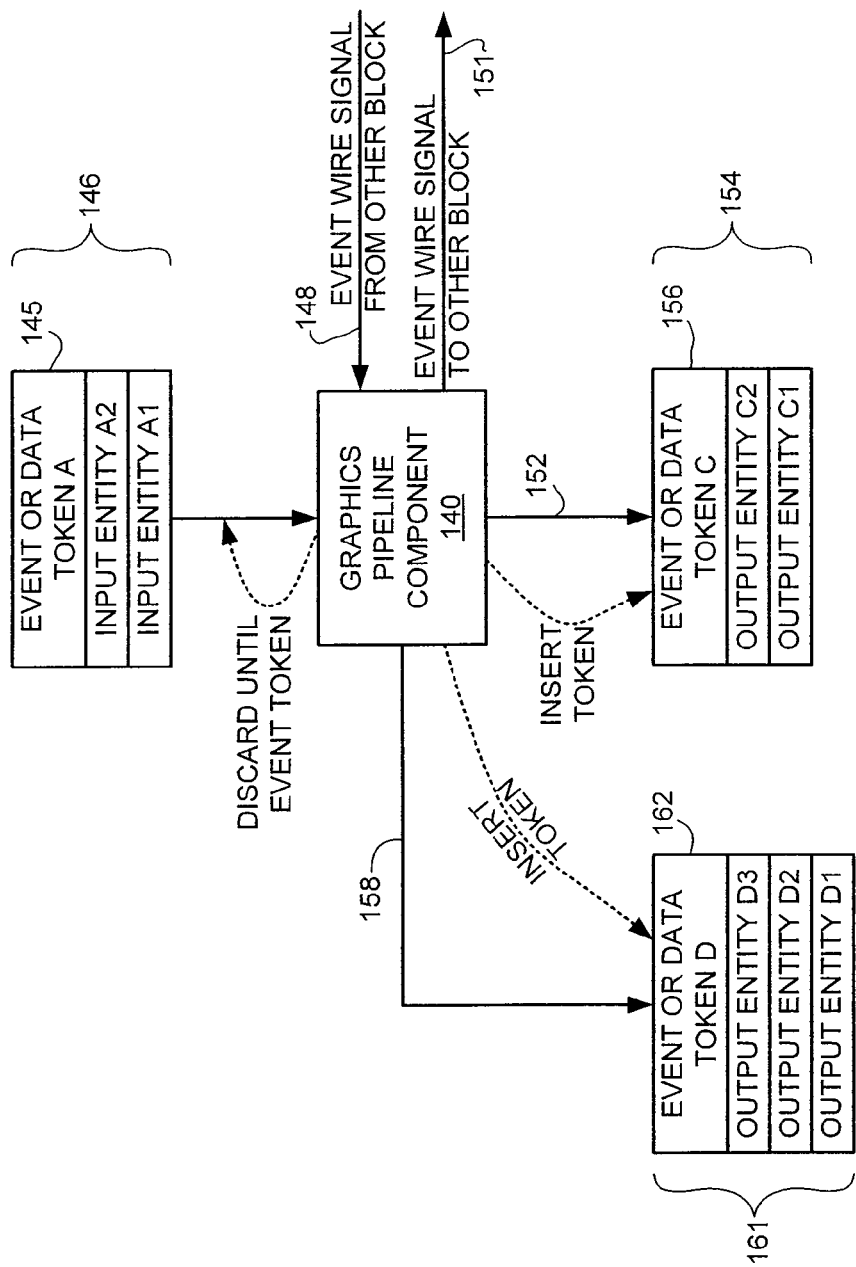
FIG. 5 is a diagram of a fork-type graphics processing component that may have one input and a plurality of output paths to other components within graphics pipeline of FIG. 3.

FIG. 5 is a diagram of a fork-type graphics processing component 140 that may have one input and a plurality of output paths to other components within graphics pipeline 110 of FIG. 3. In addition to backpressure and discard synchronization, as described above with the regular-type unit 120 of FIG. 4, this fork-type graphics processing component 140 may be configured to insert tokens between the output data flow entities to provide barrier or divider functionality.

Thus, the graphics pipeline component 140 in this nonlimiting example may receive an event or data token 145 from the FIFO 146, which may be configured between a prior graphics pipeline processing component, as one of ordinary skill in the art would know. Upon receipt of the event or data token 145 by graphics pipeline component 140, the graphics pipeline component 140 may initiate or cease a certain corresponding synchronization-oriented operation. As a nonlimiting example, if event or data token 145 initiates a discard process, the graphics pipeline component 140 may discard the contents of FIFO 146 until receipt of the end token which may be subsequently replaced in FIFO 146 by a previous component, which is not shown in FIG. 5.

Likewise, graphics pipeline component 140 may be configured to receive an event signal via event wire 148, which may have originated from another processing component, as similarly described above. Thus, upon receipt of an event signal, graphics pipeline unit 140 may initiate discarding operations into FIFO 146, as similarly described above, which is a mere nonlimiting example. Graphics pipeline component 140 may be configured to take a number of synchronization-oriented actions upon receipt of an event or data token or event signal, as described herein.

The graphics pipeline component 140 of FIG. 5 may be configured to output tokens and/or signals, as similarly described above. An event signal may be communicated along path 151 to any other block in the graphics pipeline that is coupled to the path 151 in similar fashion as described above.

However, graphics pipeline component 140 may be configured to insert a token into the data processing path of two or more processing blocks that may follow the graphics pipeline component 140. In a first nonlimiting example, path 152, which may be a data path to a subsequent graphics processing component, the graphics processing component 140 may insert event or data token 156, into the FIFO 154, which may be configured to initiate a certain process or operation. Thus, this event or data token 156 may follow output entities C1 and C2 so that when it is reached by the subsequent graphics pipeline component, an event is recognized and corresponding steps follow thereafter. Graphics pipeline component 140 may subsequently place an additional token signifying the end of the event and resumption of and/or previous operations.

Instead of communicating an event or data token 156 in path 152 to FIFO 154, the fork-type graphics pipeline component 140 may also communicate an event of data token 162 along path 158, which may lead to another graphics pipeline component. In similar fashion, FIFO 161 may be coupled to a subsequent graphics pipeline component along a path that is separate from the path 152. Thus, the graphics pipeline component 140 may communicate tokens along at least two different data paths. Inserting token 162 into FIFO 161 enables the commencement and/or completion of synchronization-oriented actions corresponding to the token as may be programmed in the graphics pipeline 110 of FIG. 3. In this way, a fork-type unit 140 may be configured to communicate tokens along branched output paths 152 and 158 in this fashion, as one of ordinary skill in the art may appreciate.

One of ordinary skill would also understand that the fork-type graphics processing component 140 may have more than two outputs. However, irrespective of the actual number of outputs, this type of component sends tokens and data down the appropriate output based on data and signals received as the previously described outputs.

Figure 6:
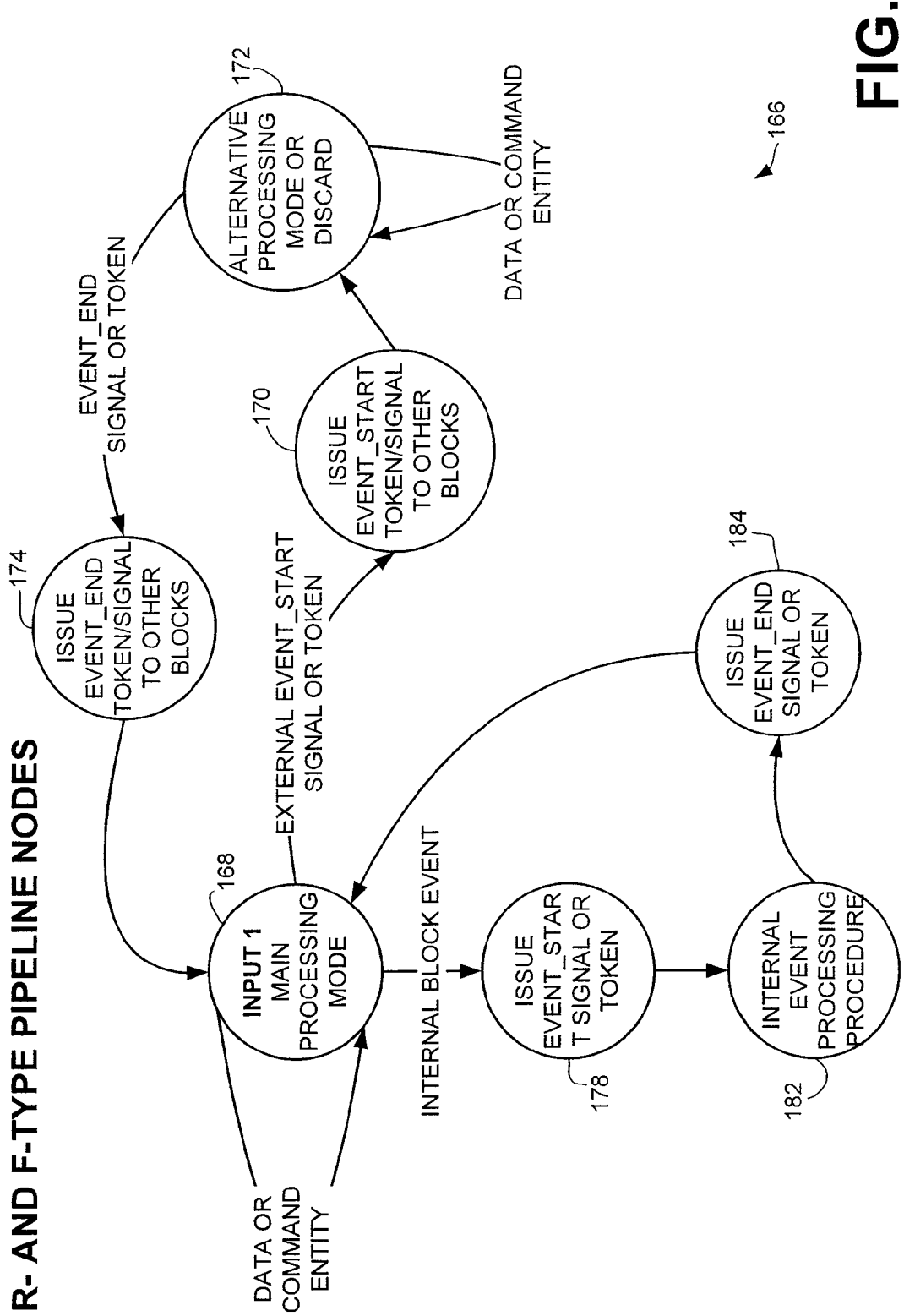
FIG. 6 is a diagram of the processing flow for the regular and fork-type processing units, as may be configured within graphics pipeline of FIG. 3.

FIG. 6 is a diagram 166 of the processing flow for the regular and fork-type processing units, 120 and 140 respectively, as may be configured within graphics pipeline 110 of FIG. 3. The commonality between the regular and fork-type processing units 120 and 140 are that they have one data input such that the graphics pipeline component corresponding to the regular and/or fork-type block may execute a routine wherein data and/or commands received upon the one input are processed and executed.

However, when an external event starts, as signals or tokens are received, as described above, the process moves from step 168 to step 170. This process may include issuance of an event start token or a corresponding signal to other blocks, as a nonlimiting example. Upon receipt of this external start signal and/or token, the recipient graphics pipeline unit may move to step 172 and initiate an alternative processing mode and/or discard sequence (as described above). Thereafter, in step 174, an event end signal or token may be received or reached in the processing flow such that the graphics pipeline component issues an event end token or signal to any other components in similar fashion, as with the event start token, as described above. Thereafter, the process may resort back to process 168 to resume normal processing operations.

A graphics pipeline component may also experience an internal block event that results in the issuance of a signal or an event or data token to other graphics pipeline components within the graphics pipeline 110 of FIG. 3. Thus, in step 178, a graphics pipeline component may issue an event start signal or token as a result of an internal block event. Thereafter, in step 182, an internal event process and procedure may follow such that the graphics pipeline component, which issued the event start token and/or signal, executes operations according to that internal block event.

Upon completion of processing associated with the internal block event, the graphics pipeline component (120 or 140) may move to step 184 and issue an event end signal or token, so as to communicate completion of that process to the proper recipient components in the graphics pipeline 110 (FIG. 3).

Thereafter, the process moves back to step 168 to resume normal processing operations. In this way, however, the regular-type unit 120 and fork-type block 140 are able to communicate signals and/or tokens along the output paths as needed in correspondence with any input signals and/or tokens received or those generated by the blocks themselves corresponding to an internal event.

Figure 7:
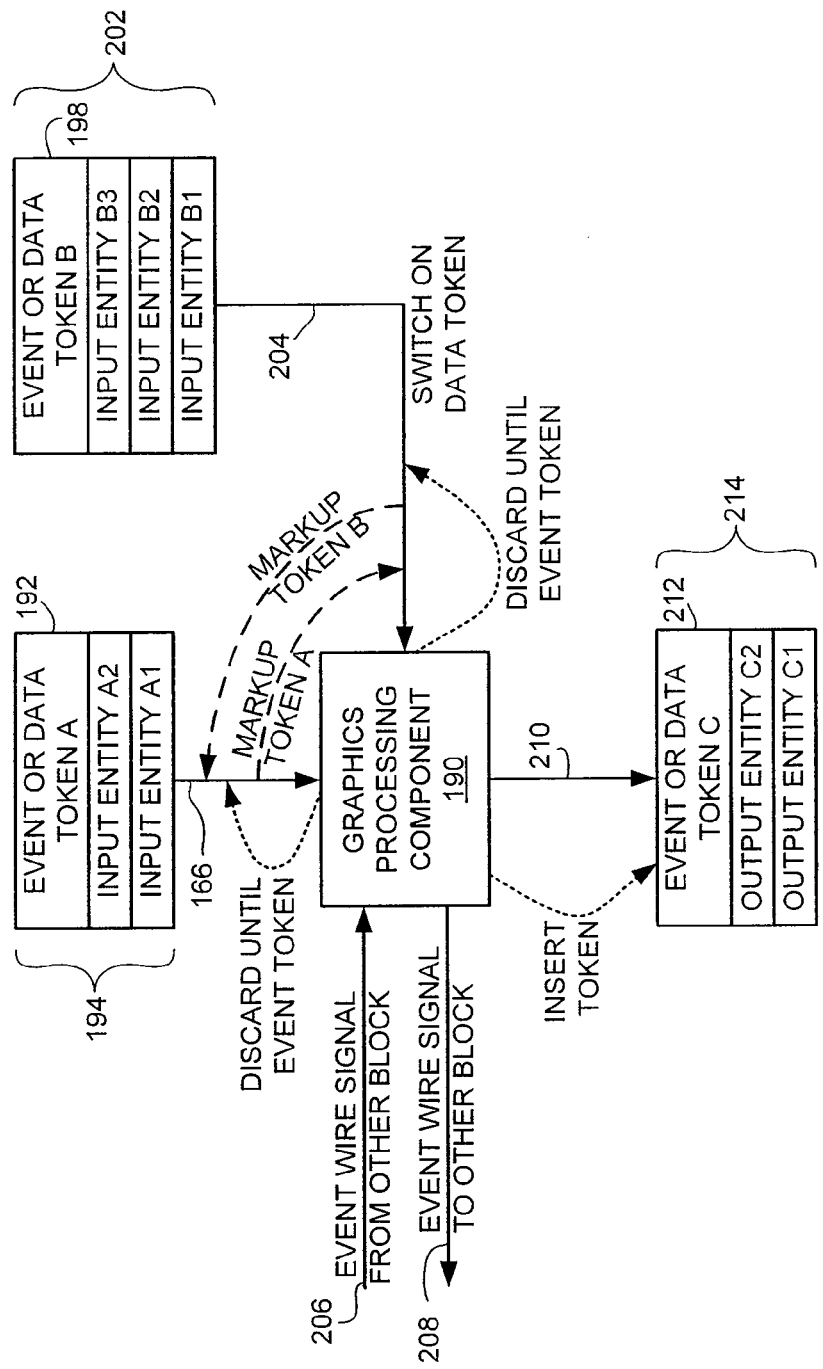
FIG. 7 is a diagram of a join type component that may be of and is the graphics pipeline of FIG. 3, which has two data inputs and one data output.

FIG. 7 is a diagram of a join type component that may be in the graphics pipeline 110 of FIG. 3, which has two data inputs and one data output. In similar fashion as described above, graphics pipeline component 190 may receive an event or data token 192 from FIFO 194, as may be inserted by a previous processing pipeline unit within the graphics pipeline 110 of FIG. 3. When the event or data token 192 is realized upon being communicated via path 166, the corresponding synchronization-oriented action may be implemented, which may include discarding the FIFO 194 until receipt of the corresponding end-event token (not shown but described herein).

Similarly, graphics pipeline component 190 may be configured to receive event or data token 198 from FIFO 202, which may be coupled to graphics pipeline component 190 via path 204. Upon receipt of event or data token 198 along path 204, graphics pipeline component 190 may follow with discarding the FIFO 202 until receipt of the corresponding event end token, as also described above, or may take other predetermined action.

One or both event or data tokens 192 or 198 may be configured to cause the graphics pipeline component 190 to switch between paths 166 and 204. Instances may arise wherein the graphics pipeline component 190 needs to receive data from an input so as to process related data. Thus, if a particular token configured as "Markup Token A," is received via path 166 at graphics pipeline component 190, the result may cause the graphics pipeline component 190 to begin receiving data and/or information along path 204 from FIFO 202. Likewise, if another token 198 configured as "Markup Token B," is received by graphics pipeline component 190, the component may be thereafter instructed to receive data upon path 166, which is the other input in this nonlimiting example.

The graphics pipeline component 190 may also be configured to receive event signals along path 206, as well as to output event signals along path 208, as similarly described above. Event signals and event tokens may be used in combination, as also described above, for input data discard operations and switching the graphics pipeline component 190 among its various inputs for effective data processing, all as nonlimiting examples.

Graphics pipeline component 190 may be configured to insert token 212 into a FIFO 214 that may be subsequently coupled to the output of graphics pipeline component 190 via path 210. This process of inserting output tokens, such as token 212, may be related to a token received via event inputs 166 or 204 or from a signal received upon event wire 206. Furthermore, the graphics pipeline component 190 may also insert token 212 based upon an internal event in component 190, as described above.

Finally, graphics pipeline component 190, which is a join-type unit, may also be configured for backpressure synchronization, as described above with the regular and fork-type units 120 and 140, respectively. Thus, graphics pipeline component 190 can synchronize and be synchronized in the graphics pipeline 110 of FIG. 3.

Figure 8:
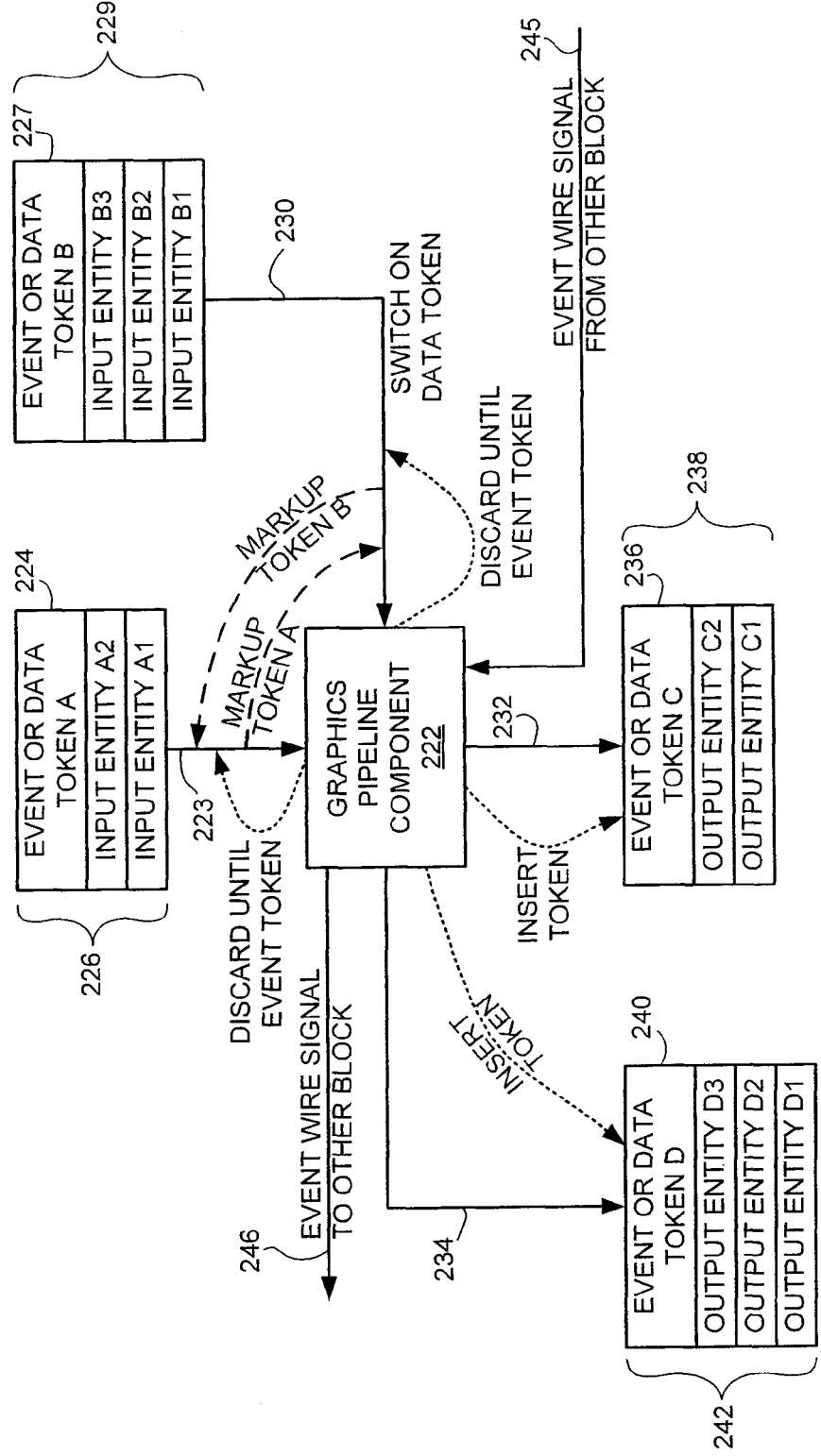
FIG. 8 is a diagram of a join/fork-type unit, which may constitute another type of processing component within graphics pipeline of FIG. 3.

FIG. 8 is a diagram of a join/fork-type unit 220, which may constitute another type of processing component within graphics pipeline 110 of FIG. 3. In this nonlimiting example, as shown in FIG. 7, a graphics pipeline component 222 is configured with two or more inputs and also two or more outputs so that tokens may be received and/or communicated according to the various inputs and outputs.

For simplicity, the inputs 223 and 230 to graphics processing component 222 are configured like those similarly described above regarding join-type graphics processing component 190. Stated another way, join/fork component 220 operates in similar fashion regarding its inputs as does the join-type graphics processing component 190 regarding its inputs, as discussed above.

Likewise, outputs 232 and 234 of graphics processing component 222 are configured like those as similarly described above regarding the fork-type graphics processing component 140. Stated another way, join/fork component 220 operates in similar fashion regarding its output as does the fork-type graphics processing component 140 regarding its outputs, as discussed above.

Figure 9:
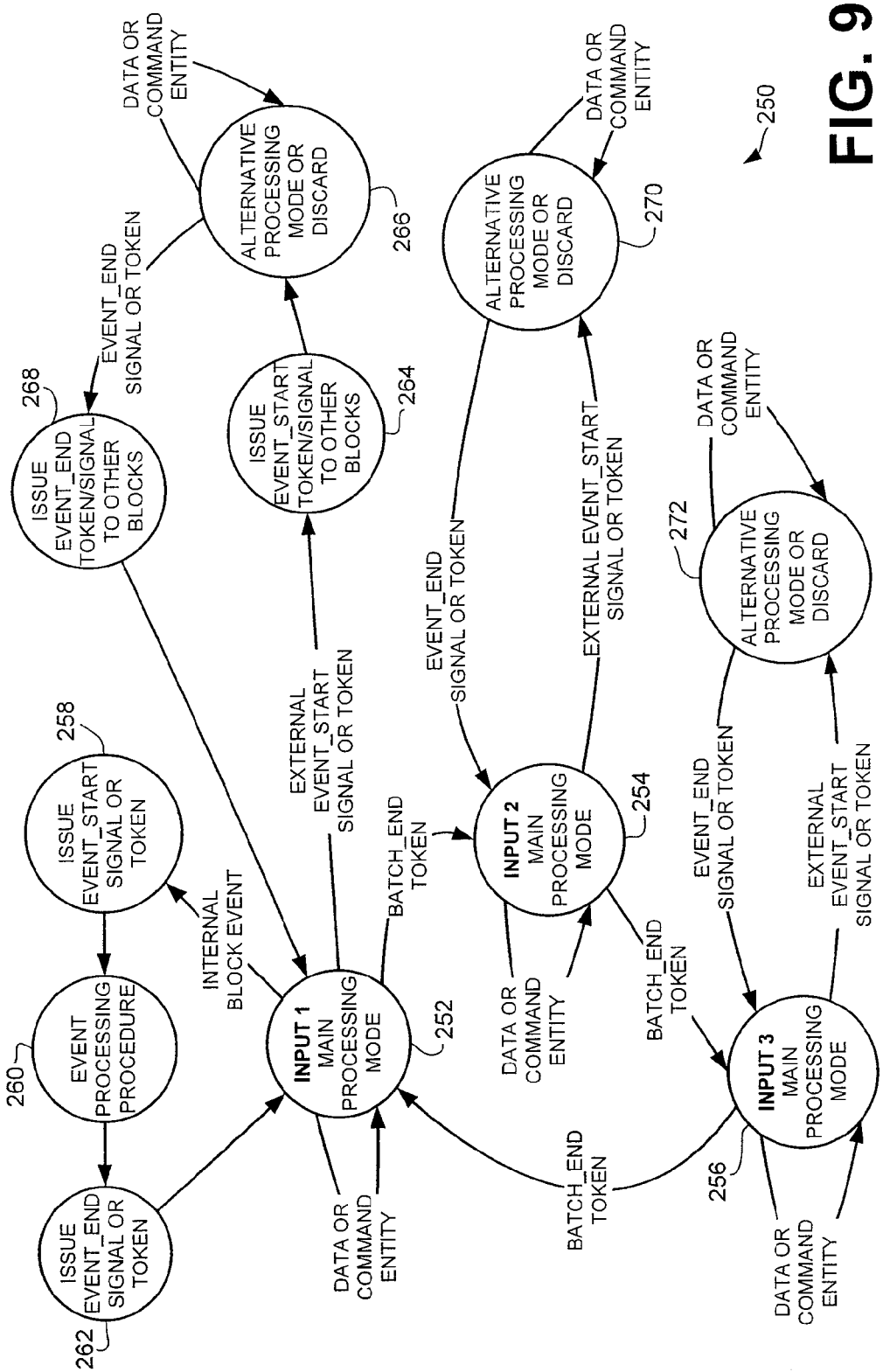
FIG. 9 is a flowchart diagram of the exemplary state machines for the join-type unit of FIG. 7 and the join/fork-type of FIG. 8.

FIG. 9 is a flowchart diagram 250 of the exemplary state machines for the join-type graphics processing component of FIG. 7 and the join/fork-type graphics processing component 220 of FIG. 8. These components are similar in some respects in that they have multiple inputs and/or multiple outputs. In this nonlimiting example 250 of FIG. 9, if the graphics processing component (190 or 220) is configured with three inputs, the graphics pipeline component may maintain a main processing mode for executing data or command entities, according to the first input, as shown in step 252. Upon reaching the end of a batch associated with input 1, which may be signified by batch-end markup token, the graphics pipeline component may move to input 2 and initiate processing according to data and/or commands for that input, as shown in step 254. Upon reaching the end of that process, a batch end-token may cause the graphics pipeline component to move to a third input (and so on) wherein this process is repeated such that the graphics pipeline unit ultimately returns to processing data and/or commands for input data 1.

However, as similarly described above, upon recognition of an internal event, the graphics pipeline component may move to step 258 and issue an event start signal or token. This signal may be communicated upon the output wire from the graphics pipeline component, such as path 208 in FIG. 7 or path 246 in FIG. 8. Event tokens may be output via the data output path from the graphics pipeline component to one or more subsequent units, as described above. Upon issuance of the event start signal or token in step 258, the graphics pipeline component may move to step 260 and commence processing related to the internal event. Upon completion of the processing in step 260, the graphics pipeline component may move to step 262 and issue an event end signal or token in similar fashion as above so as to communicate such completion to other components in the graphics pipeline 110.

The graphics pipeline component, which may be implementing the steps shown in FIG. 9, may receive an external event start signal or token, as similarly described above. Thus, this process may cause the graphics pipeline component to move from step 252 (or steps 254 or 256 depending upon the actual input being processed when the signal or event token is received) so as to issue an event start token to other components. After issuing the event token in step 264, the graphics pipeline component may initiate an alternative processing mode or data discard operation to expunge data in the FIFO coupled to the graphics pipeline. This processing in step 266 may continue until interrupted or completed, as shown, thereby leading to step 268, wherein an event end token or signal may be received by the graphics pipeline component. Thus in step 268, the graphics pipeline component may issue an event end token or signal to other components indicating the termination of the external event corresponding to the interruption. Thereafter, the graphics pipeline unit may return to main processing mode, as described above.

Steps 270 and 272 of FIG. 9 represent that the graphics pipeline component implementing the steps shown in FIG. 9 may be interrupted by an external event signal or token when processing according to input 2 or 3, as similarly described above in regard to input 1. Thus, upon receipt of such a signal or token, an alternative processing mode may initiated in conjunction with the outputting of additional tokens to other components coupled to the output of the join-type component 190 and/or join/fork-type component 222.

Figure 10:
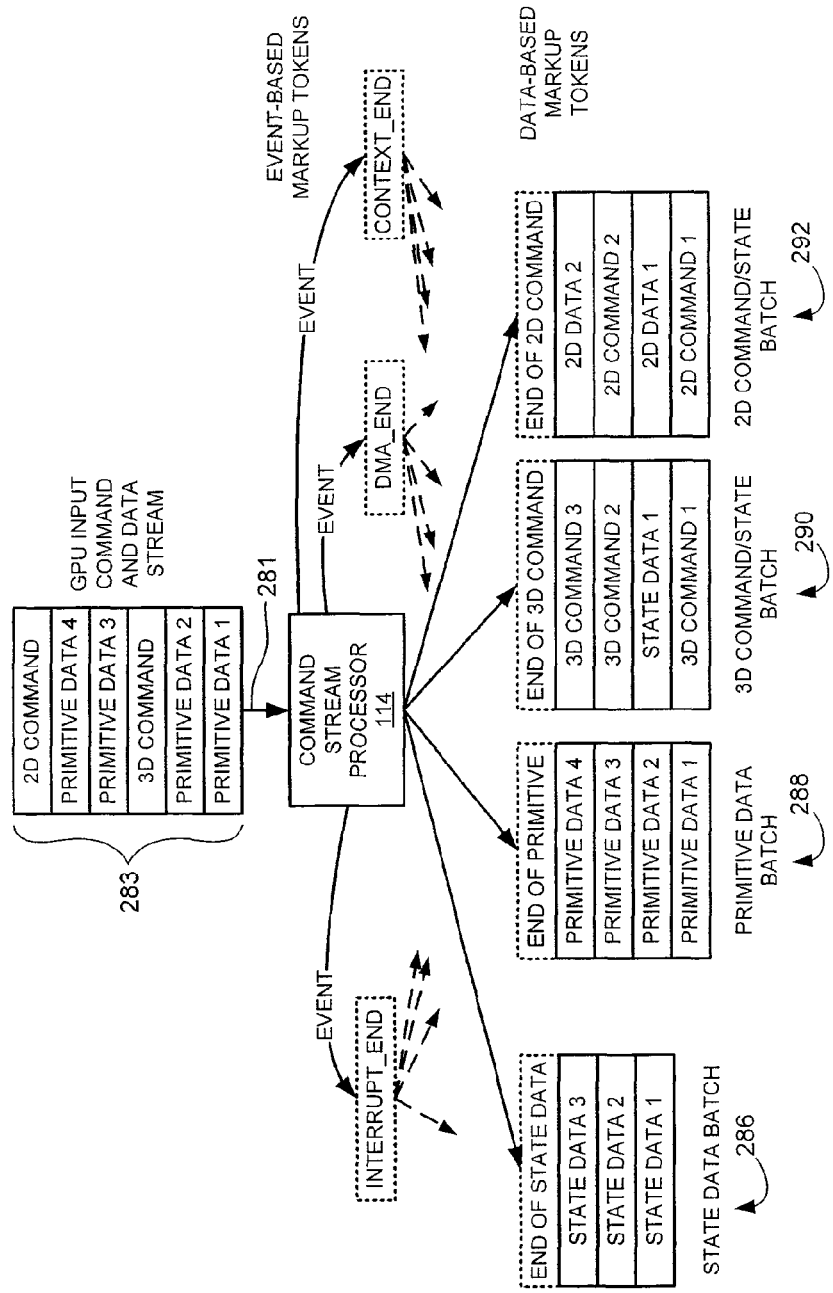
FIG. 10 is a diagram of the command stream processor of FIG. 3 in the graphics pipeline of FIG. 3 and a nonlimiting example of a fork-type component, such as the fork-type component as described in regard to FIG. 5.

FIG. 10 is a diagram of the command and data parser 114 of FIG. 3 in the graphics pipeline 110 of FIG. 3 as a nonlimiting example of a fork-type component, such as the fork-type component 140, as described in regard to FIG. 5. In this nonlimiting example, the command and data parser 114 may insert event and data tokens based on data and or events in the input stream 283 received on path 281. Input stream 283 may relate to data and events that have occurred within the graphics pipeline 110 of FIG. 3.

The command and data parser 114 (which may also be configured as a command stream processor (CSP)) may be configured to decode information about the type and data length in the individual commands in stream 283 so that relevant tokens may be inserted into the corresponding and proper output stream, as shown in FIG. 10. Thus, as a nonlimiting example, when command and data parser 114 receives state data, such as state data 1, state data 2 or state data 3, command and data parser 114 may forward such state data to the state data batch 286, which later would be delivered to designated pipeline components, as shown in FIG. 10.

Similarly, for primitive data 1-4 shown in stream 283, command and data parser 114 may output each such primitive data component to a primitive data batch 288 that may be processed along a corresponding number of graphics pipeline components so configured. Similarly, for state data and 3D commands corresponding to 3D graphics components, the command and data parser 114 may forward such commands and state data along the path corresponding to the 3D commands in state batch 290 processing units so configured for 3D processing. Finally, command and data parser 114 may forward 2D commands and corresponding data in a 2D command and state batch 292 for routing to graphics pipeline units that are configured for processing 2D commands and data. Thus, in this way, the command and data parser 114 operates as a fork-type units to forward data corresponding to a certain type of processing operations to its appropriate component.

Upon the recognition by command and data parser 114 of an event in the data stream 283 or otherwise, such as by signal interrupt, one or more event-based tokens may be inserted in each of the batches described above (286, 288, 290, and 292). As nonlimiting examples, an "interrupt end" token, a "DMA end" token and a "context end" token may comprise three nonlimiting exemplary tokens that may be forwarded to one or more of the output paths of command and data parser 114.

Figure 11:
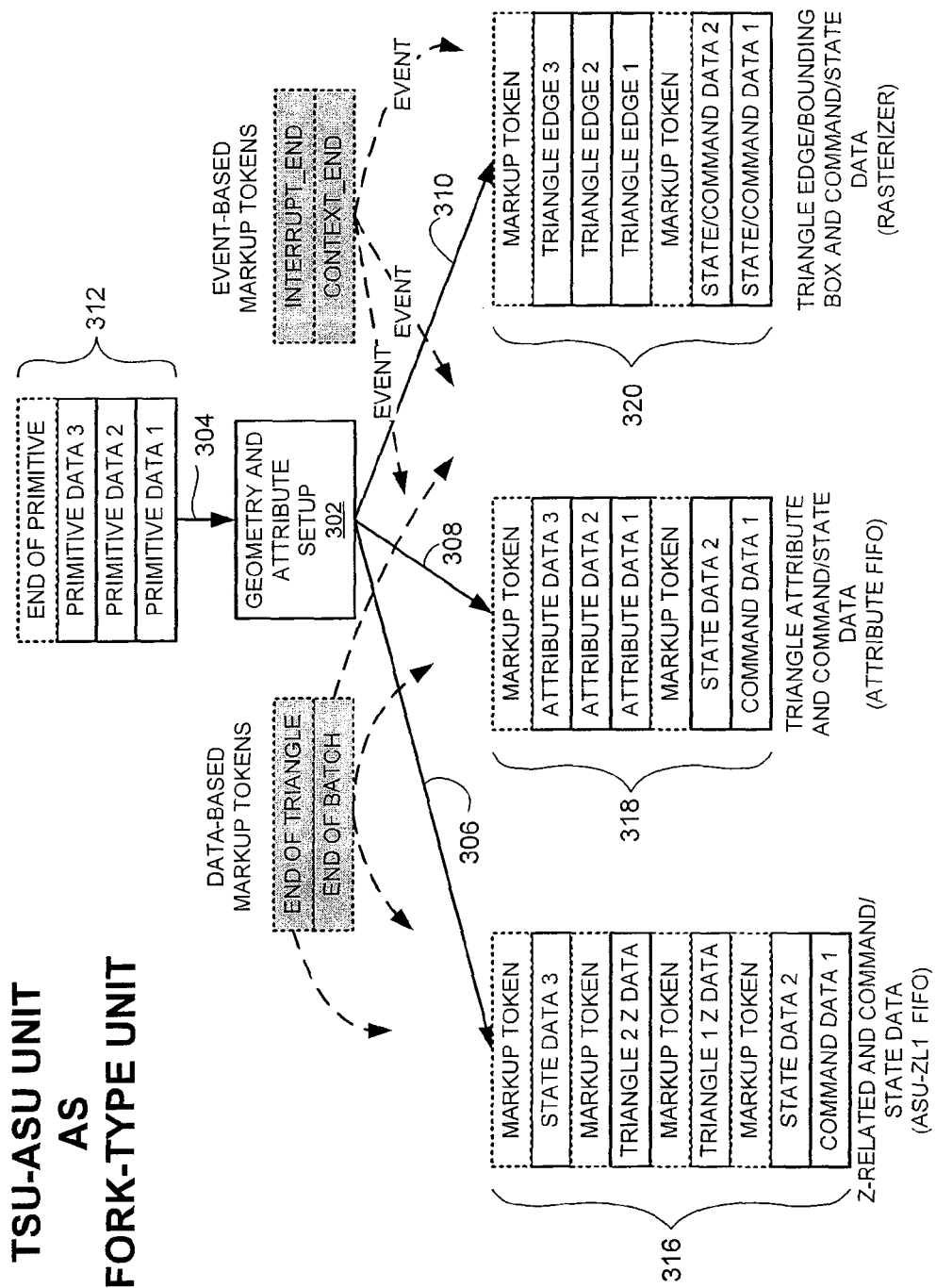
FIG. 11 is a diagram of the TSU-ASU components of graphics pipeline of FIG. 3 and a nonlimiting example of a fork-type, as shown in FIG. 5.

FIG. 11 is a diagram 300 of the TSU-ASU (triangle setup unit/attribute setup unit) components or units of graphics pipeline 110 of FIG. 3 and a nonlimiting example of exemplary fashion corresponding to a fork-type, as shown in FIG. 5. In this nonlimiting example, the geometry and attributes set up unit 302 may be configured with a single input via path 304 and three outputs corresponding to paths 306, 308 and 310, which may each be coupled to components further in the graphics pipeline 110 of FIG. 3. Thus, as data is received corresponding to the FIFO 312 along input path 304, the geometry and attributes set up unit 302 may distribute the commands and data via one of the three outputs 306, 308, and 310, as similarly described above. Thus, in this nonlimiting example, the geometry and attributes set up unit 302 may forward via path 306 state data, event and data tokens, and other triangle information to the Z-related and command/state data FIFO, which may correspond to the FIFO 316 of FIG. 3.

A second output 308 coupled to geometry and attributes set up unit 302 may be coupled to the attribute FIFO 318 of FIG. 3. This attribute FIFO 318 may be configured to receive attribute data, event and data tokens, and state data corresponding to triangle attribute and command/state data.

Finally, geometry and attributes set up unit 302 may forward via output 310 to FIFO 320 any triangle edge/bounding box and command/state data for further processing, as a nonlimiting example. Thus, geometry and attribute set up unit 302 may forward state and command data and/or triangle edge information received from FIFO 312 via path 304 and/or what may be processed by geometry and attributes set up unit 302. Plus, geometry and attribute setup unit 302 may also output one or more event or data tokens, as shown in FIG. 11, into FIFO 320.

Figure 12:
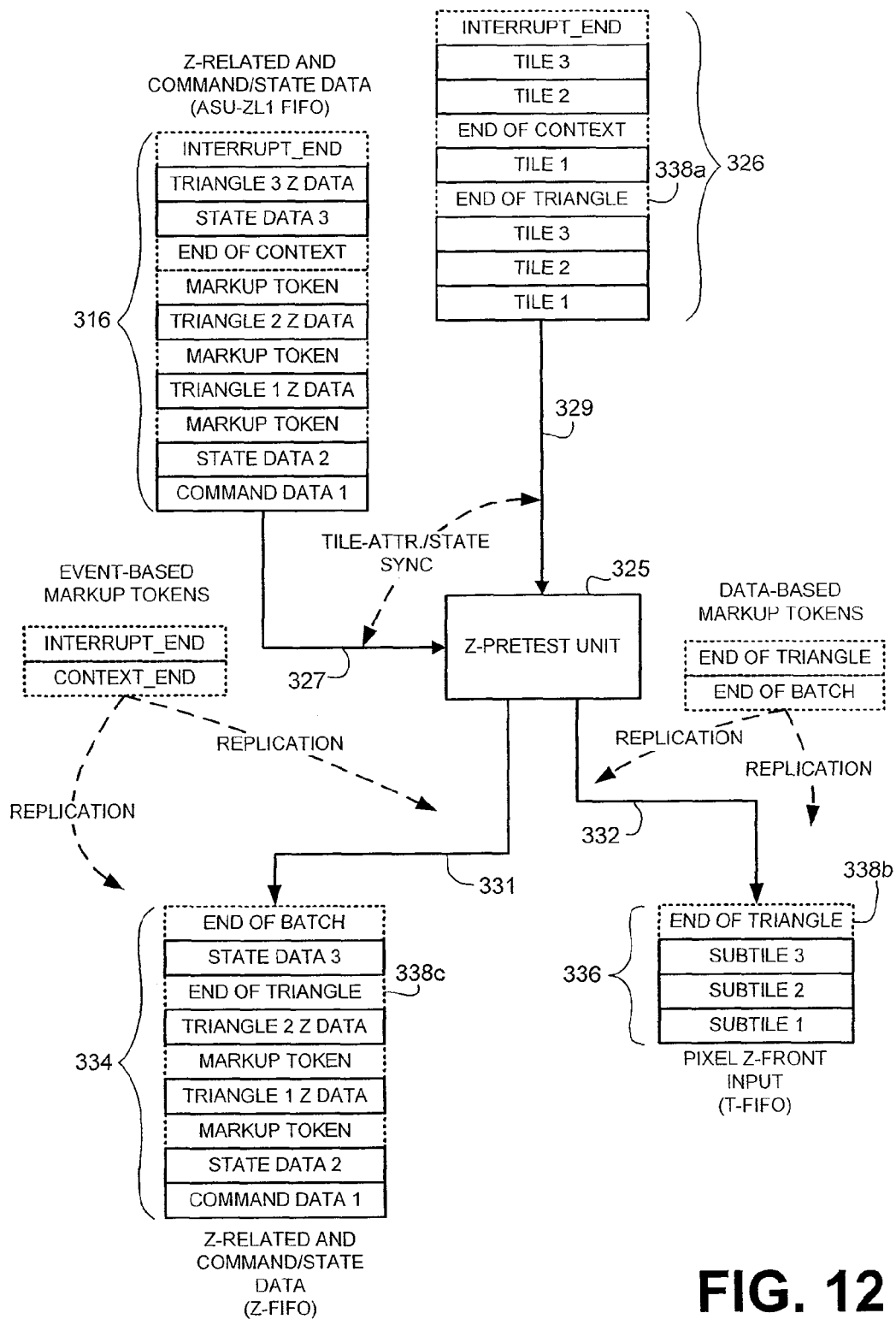
FIG. 12 is a diagram of Z pretest unit of FIG. 3 shown in nonlimiting exemplary fashion as the join/fork-type unit of FIG. 8.

FIG. 12 is a diagram of the Z pretest (ZL1) unit 325 of FIG. 3 shown in nonlimiting exemplary fashion as the join/fork-type unit 222 of FIG. 8. In this nonlimiting example, Z pretest unit 325 may be coupled so as to receive data and/or information from ASU-ZL1 FIFO 316 of FIG. 3 as well as the ST (Super Tile) FIFO 326 of FIG. 3. Each of these FIFOs 316 and 326 may contain commands, state data, and event and data tokens, as similarly described above.

Z pretest unit 325 may be configured to alternate between the inputs 327 and 329 so as to create outputs 331 and 332 that are coupled to Z FIFO 334 and T FIFO 336, both of FIG. 3. Event tokens, such as "end of context" or "interrupt end" tokens may be positioned within FIFO 316 and 326 that are executed and passed on via outputs 331 and 332 to the corresponding Z FIFO 334 and T FIFO 336. So, in a nonlimiting example, if Z pretest unit 325 is processing instructions and commands according to ST FIFO 326 and receives the "end of triangle" data token 338a, the Z pretest unit 325 may cause the "end of triangle" data token to be forwarded via output 332 into the T FIFO 336 at position 338b, as shown in FIG. 12.

Likewise, Z pretest unit 325 may also pass a "end of triangle" data token 338c to the Z FIFO 334, thereby causing the token to be duplicated into the dual outputs of the Z pretest unit 325. In this way, the Z pretest unit 325 receives commands and data via its dual inputs and, after performing the appropriate calculations and operations, forwards outputs to one or more of outputs 331 and 332 so that components further in the pipeline 110 receive the synchronized command and data for processing.

As similarly described above, receipt of event-based tokens, such as "interrupt end" and/or "context end" event tokens may cause replication among each of the outputs of Z pretest unit 325, as shown in FIG. 12. Likewise, the receipt of a data-based token by Z pretest unit 325, such as "end of triangle" or "end of batch" tokens may also lead to the replication of the data-based tokens in each of the outputs 331 and 332, as shown in FIG. 12 (i.e., end of triangle tokens 338b and 338c). Thus, this is but one nonlimiting example of how a pipeline processing component may function with two or more inputs and two or more outputs so as to coordinate processing of data as well as the synchronization of various components in the graphics pipeline 110.

It should be emphasized that the above-described embodiments and nonlimiting examples are merely possible examples of implementations, merely set forth for a clear understanding of the principles disclosed herein. Many variations and modifications may be made to the above-described embodiment(s) and nonlimiting examples without departing substantially from the spirit and principles disclosed herein. All such modifications and variations are intended to be included herein within the scope of this disclosure and protected by the following claims.

The invention claimed is:

1. A method for a graphics pipeline to synchronize data in the graphics pipeline, wherein a plurality of graphics pipeline components form the graphics pipeline, the method comprising the steps of:
   receiving one or more input tokens on a data input at a graphics pipeline component having one data input and one data output;
   receiving one or more input signals on an input signal path of the graphics pipeline component;
   outputting one or more synchronization tokens on the data output to one or more other components within the graphics pipeline, wherein the one or more synchronization tokens are associated with the one or more input tokens, the one or more input signals, or an internal event of the graphics pipeline component; and
   outputting one or more synchronization signals on an output signal path of the graphics pipeline component via an event wire directly to one or more other components within the graphics pipeline, wherein the one or more synchronization signals correspond to the one or more input tokens, the one or more input signals, or the internal event, where the one or more other components of the graphics pipeline comprise at least one of: fixed function units and programmable units.

2. The method of claim 1, wherein the one or more input tokens is an event token that causes the graphics pipeline component to empty contents of a buffer associated with the graphics pipeline component until receipt another input token.

3. The method of claim 1, wherein the one or more input signals causes the graphics pipeline component to empty contents of a buffer associated with the graphics pipeline component until receipt another input token.

4. The method of claim 1, wherein the graphics pipeline component implements an alternate processing mode for data associated receipt of the one or more input tokens or the one or more input signals and outputs the synchronization signal or the synchronization token to one or more other components upon completion of the alternate processing mode.

5. The method of claim 1, further comprising the steps of:
   receiving a backpressure synchronization signal from a next component in the graphics pipeline;
   implementing a predetermined action in response to receipt of the backpressure synchronization signal; and
   outputting a backpressure synchronization signal to a prior component in the graphics pipeline in response to a predetermined event.

6. The method of claim 1, wherein the synchronization tokens are placed between different data entity types to create a barrier between the different data entity types.

7. A graphics pipeline system, comprising:
   a processing component having one data input, one data output, one wire signal input, and one wire signal output, the processing component configured to receive at least an event start token and an event end token on the data input and to output the event start token and the event end token on the data output, the processing component also being configured to receive at least one of event start and end signals on the wire signal input path and to output at least one of the event start and end signals on the wire signal output path, wherein the processing component is configured to perform synchronization control based on combinations of the event start token, the event end token, the event start signal, and the event end signal, wherein the event start signal and the event end signal are communicated via an event wire coupled between processing components in the graphics pipeline;
   the processing component having a synchronization backpressure input configured to communicate with a next processing component in the graphics pipeline; and
   the processing component having a synchronization backpressure output configured to communicate with a prior processing component in the graphics pipeline.

8. The graphics pipeline system of claim 7, the processing component further comprising:
   one or more other data outputs in addition to the one data output, the processing component being configured to output at least the event start token and the event end token on at least one output of the one data output and the one or more other data outputs.

9. The graphics pipeline system of claim 7, the processing component further comprising:
   one or more other data inputs in addition to the one data input, the processing component being configured to receive at least the event start token and the event end token on at least one input of the one data input and the one or more other data inputs and to output data on the one data output.

10. The graphics pipeline system of claim 7, the processing component further comprising:
   one or more other data inputs in addition to the one data input, the processing component being configured to receive at least the event start token and the event end token on at least one input of the one data input and the one or more other data inputs; and one or more other data outputs in addition to the one data output, the processing component being configured to output at least the event start token and the event end token on at least one output of the one data output and the one or more other data outputs.

11. The graphics pipeline system of claim 7, wherein the processing component sends the event start token and the event end token on one of the plurality of data outputs in response to the event start token being received on at least one input of the one data input and the one or more other data inputs, the one wire signal input, or upon occurrence of a predetermined internal event in the processing component.

12. The graphics pipeline system of claim 7, wherein the processing component comprises one of: a fixed function unit and a programmable unit.

13. The graphics pipeline system of claim 12, wherein the processing component is coupled to other processing components via first-in-first-out (FIFO) buffers storing different data structures.

14. The graphics pipeline system of claim 13, wherein the data structures comprise data and event tokens.

\* \* \* \* \*